United States Patent [19]

Frost

[11] 4,178,476
[45] Dec. 11, 1979

[54] AUTOMATIC NATIONWIDE PAGING SYSTEM

[76] Inventor: Edward G. Frost, 12000 Old Georgetown Rd., Rockville, Md. 20852

[21] Appl. No.: 909,988

[22] Filed: May 26, 1978

[51] Int. Cl.² .................. H04Q 7/00; H04M 11/02
[52] U.S. Cl. .................. 179/2 EC; 179/18 BE; 340/312
[58] Field of Search .......... 179/2 E, 2 EB, 2 EC, 179/18 BE, 18 BF; 325/55; 340/311, 312; 178/4.1 R, 4.1 A, 4.1 B

[56] References Cited

U.S. PATENT DOCUMENTS

| | | | |
|---|---|---|---|
| 3,178,516 | 4/1965 | Bonanno | 179/18 BE |
| 3,314,051 | 4/1967 | Willcox et al. | 325/55 |
| 3,513,264 | 5/1970 | Baer | 325/55 |
| 3,515,812 | 6/1970 | Hackenberg et al. | 179/18 BE |
| 3,575,558 | 4/1971 | Leyburn et al. | 179/2 EB |
| 3,668,317 | 6/1972 | Vitalo | 179/2 EB |
| 3,736,382 | 5/1973 | Braun et al. | 179/18 BE |
| 3,984,775 | 10/1976 | Cariel et al. | 340/311 |
| 4,091,373 | 5/1978 | Nakamura | 340/311 |

Primary Examiner—Thomas A. Robinson
Attorney, Agent, or Firm—Rose & Edell

[57] ABSTRACT

In a radio paging system with multiple base stations covering respective geographic areas, subscribers may move freely from area to area and transfer their paging service accordingly by means of a local telephone call. Radio-transmitted pages are confined to the specific area of the subscriber's whereabouts. Pages are automatically stored while a subscriber is in transit from one area to another. If the subscriber has been paged during the transit period, he is automatically paged when his paging service is transferred upon arrival at his destination. Pages destined for a subscriber who is remotely located are originated in the same manner as if that subscriber were operating locally, i.e. by means of a local telephone call, whether or not the page originator knows the location of the recipient (subscriber). Pages may be originated from any area throughout the system for any subscriber regardless of his location. Pages are automatically forwarded to the subscriber and the area of origin is discernable to the subscriber from a digital readout on the paging receiver. The national land switched telephone network (or other transmission medium) may be used throughout the system to provide automatic page transfer, control and information signalling. Provision is made for automatic billing of subscribers at their home base station and for generation and collection of data for traffic analysis. The system may operate equally well using forms of transmission media other than the national switched telephone network, these include but are not limited to, packet data switching networks, satellite transmission and data networks, and telegraph switching networks. Direct leased lines could also be used if required.

28 Claims, 19 Drawing Figures

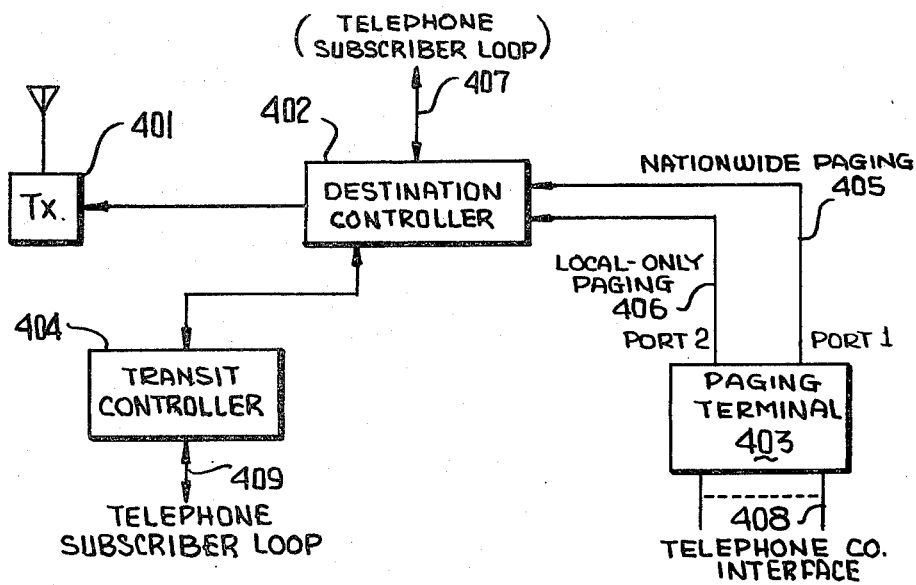
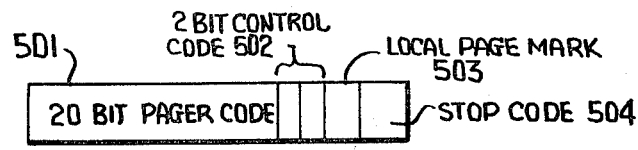
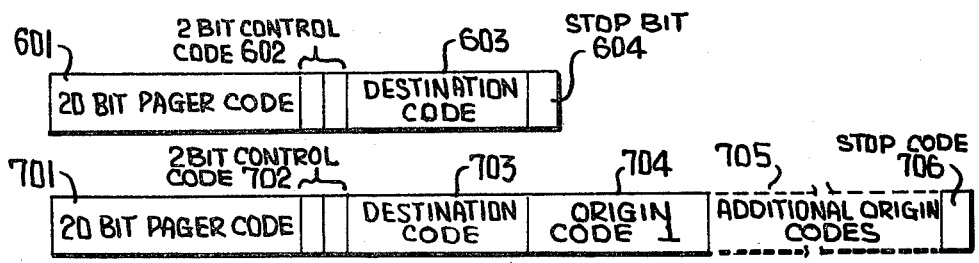
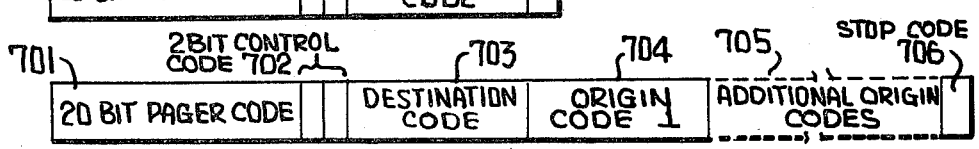
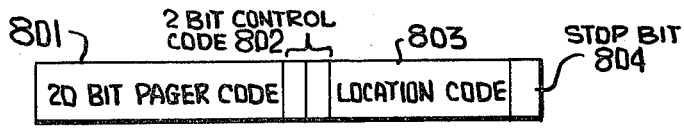
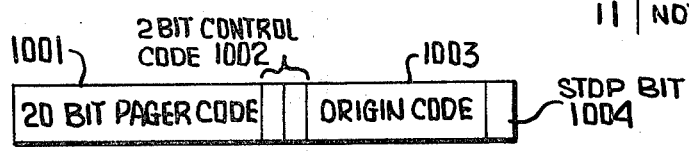
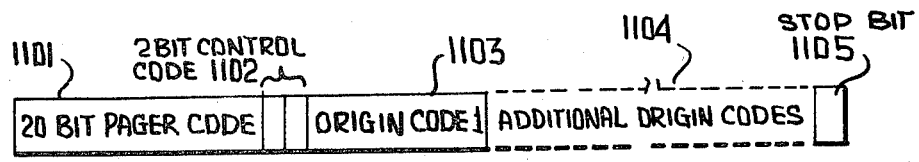

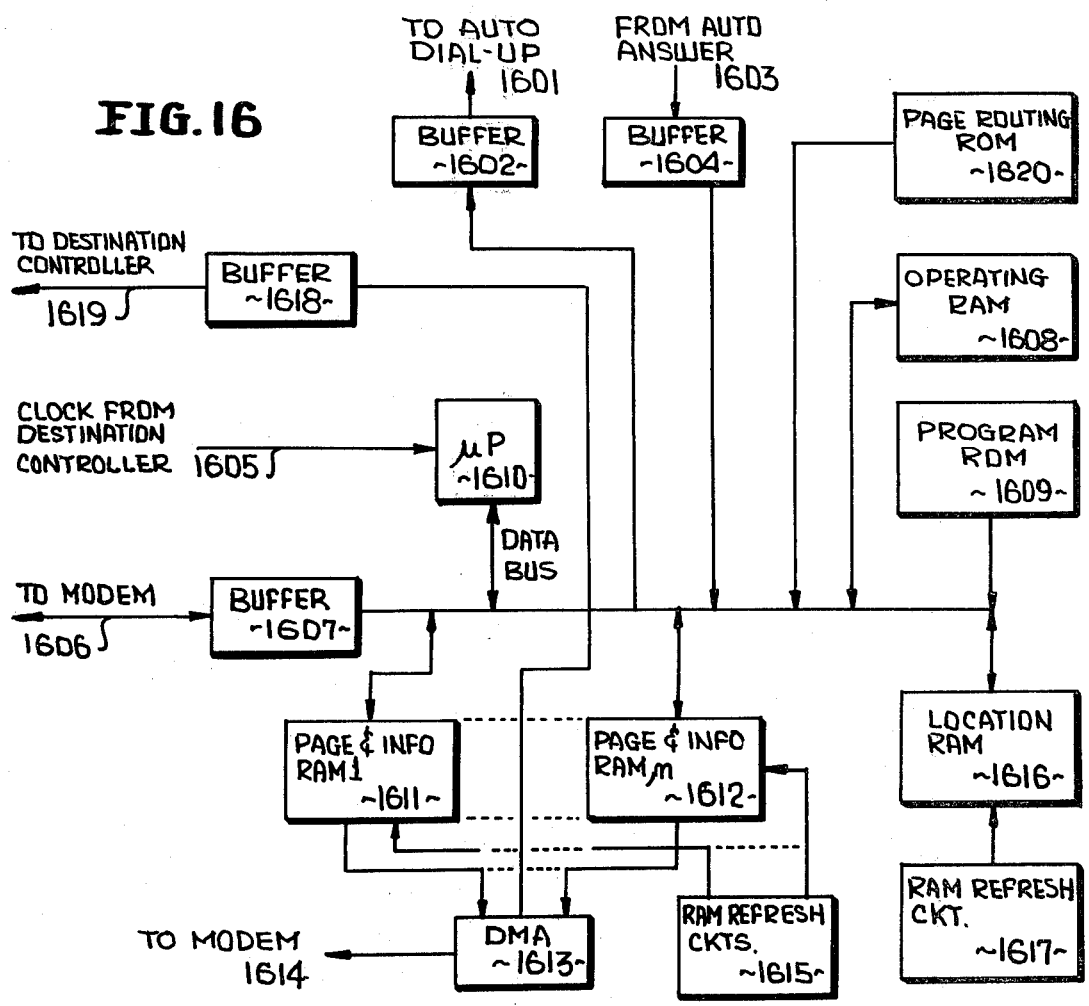
FIG. 16
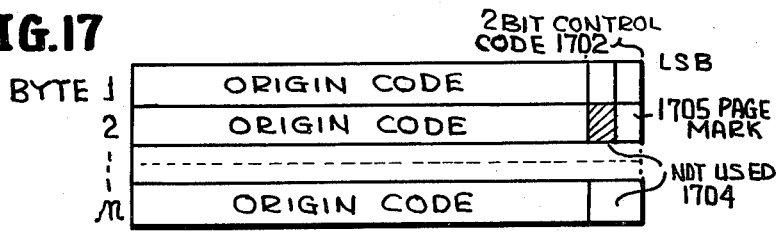
FIG. 17
| CODE | MEANING |
|---|---|
| 00 | LOCAL OPERATION |
| 01 | SERVICE SUSPENDED |
| 10 | REMOTE OPERATION |
| 11 | NOT USED |
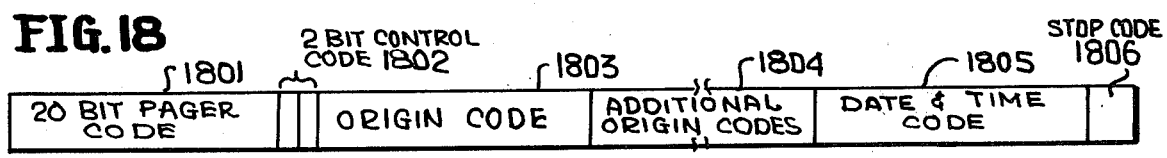
FIG. 18
FIG. 19
| CODE | MEANING |
|---|---|
| 00 | PAGE |
| 01 | SERVICE SUSPENDED |
| 10 | SERVICE REINSTATED |
| 11 | NOT USED |

AUTOMATIC NATIONWIDE PAGING SYSTEM

BACKGROUND OF THE INVENTION

The present invention relates to improvements in automatic radio paging systems. More particularly, the present invention relates to a paging system which permits a subscriber to travel substantially anywhere and receive remotely-originated pages.

Radio paging systems are quite common in most major cities. Typically, a subscriber to such system carries a small receiver which responds to a predeterminedly-coded radio signal by providing an audible tone. To page that subscriber, an individual would dial a local telephone number and enter a coded message identifying that subscriber. The base station would then automatically transmit the coded radio signal for that subscriber who, upon activation of the audible tone from his receiver, would telephone the base station to receive the message.

Several automatic and semi-automatic radio paging systems have been in operation in many parts of the world for the past few years. A number of automatic radio paging systems providing limited nationwide service are either in operation or have been proposed; for example, a national paging system operated by the Austrian PTT in Vienna, Austria; a British Post Office system operated by the General Post Office, London, England; and systems proposed by Digital Paging Systems, Inc. of Englewood, New Jersey (FCC File No. 20786-CD-(18)-78); and Arthur K. Peters, Consulting Engineers of Gainesville, Florida (FCC Docket No. RM-2750). These and other systems provide, or would provide, radio paging service of reasonable calibre to paging subscribers in keeping with the requirements and available technology at the time of their inception. The present and projected future demands for more comprehensive subscriber facilities and operating improvements, however, have outstripped the capabilities of those prior systems and system proposals.

It is therefore an object of the present invention to provide a system and method for effectng a nationwide or worldwide paging capability.

SUMMARY OF THE INVENTION

The system of the present invention overcomes most of the inherent inflexibilities of the above-mentioned and other prior art systems as well as providing comprehensive sophisticated facilities to subscribers and technological flexibility and economy to the system operators. The system provides fully automatic radio paging service to subscribers similar to that presently provided on a local basis by numerous entities; however, service is extended to cover any desired geographical area, thereby enabling subscribers to travel at will while continuing to receive pages originated anywhere in the system. In addition, the area from which a page has originated is discernible by the subscriber. Origination of all pages to a subscriber, regardless of his location, is by means of a directly dialed local telephone call. Interconnection between remote base stations is by means of digital data communications. Provision is made for billing each page to the correct subscriber via his home base station.

The system operates without the use of specialized communications facilities by making use of the national public switched telephone network. Conversely the system can operate equally well using specialized communications facilities or by use of a dedicated single or multi-media communications network.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 4 is a functional block diagram of a transit station employed in the system of FIG. 2;

FIG. 5 is a diagrammatic representation of the coded message format generated by the destination controller of FIG. 4;

FIG. 6 is a diagrammatic representation of the coded message format generated by the transit controller of FIG. 4;

FIG. 7 is a diagrammatic representation of the coded message format generated by the destination controller of FIG. 4 in response to paging service being reinstated after having been suspended;

FIG. 8 is a diagrammatic representation of the coded message format for transit station-to-transit station update of location memories;

FIG. 9 is a listing of the meanings for the various possible two-bit control codes employed in the coded formats of FIGS. 5, 6, 7 and 8;

FIG. 10 is a diagrammatic representation similar to that of FIG. 5, of the coded message format for the system of the present invention when all of the stations are interactive;

FIG. 11 is a diagrammatic representation of the coded message format generated by the destination controller in response to paging service being restored in a system wherein all stations are interactive;

FIG. 12 is a listing of the meanings for the various possible two-bit control codes employed in the coded formats of FIGS. 10 and 11;

FIG. 16 is a functional block diagram of the common control unit for the transit controller of FIG. 14;

FIG. 17 is a diagrammatic representation of the data format in the registered subscriber RAM of FIG. 15;

FIG. 18 is a diagrammatic representation of the coded billing and record keeping message format employed in the system; and FIG. 19 is a listing of the meanings for the various two-bit control codes employed in the format of FIG. 18.

DESCRIPTION OF THE PREFERRED EMBODIMENT

GENERAL

Figure 2:
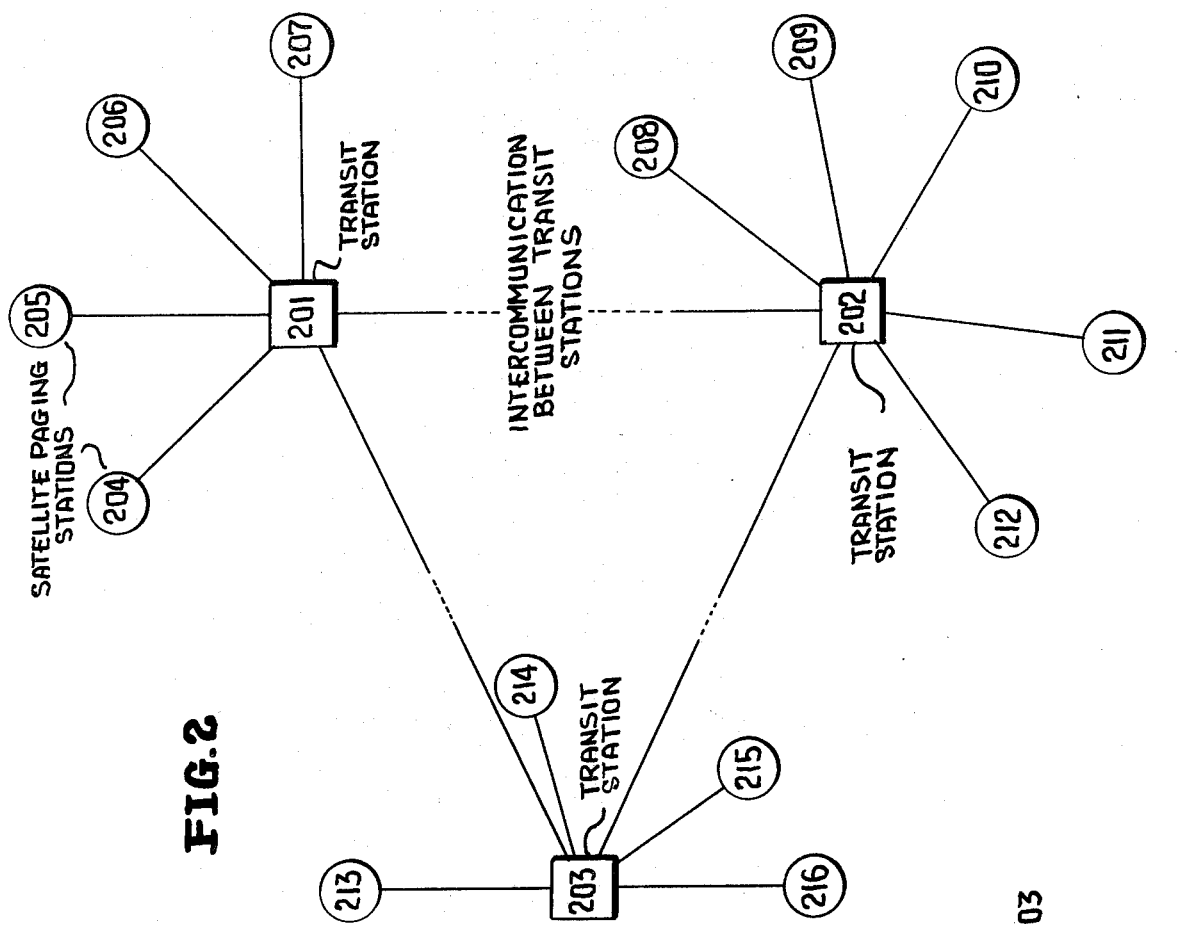
FIG. 2 is a functional diagram illustrating interaction of a trunk interconnection approach between satellite and transit stations according to the present invention.

Two specific grades of service may be provided to subscribers by any participating radio paging base station operating entity: Local-only paging; and Nationwide paging. Any number of base stations may cooperate to provide service in contiguous geographic areas.

Local-only paging may be defined as paging service provided from a base station or group of base stations to subscribers located only in the area covered by that base station or group of base stations. The service is confined to one specific area.

Nationwide service may be defined as radio paging service which may be transferred to any other area at any time as desired by the subscriber. Pages originated in the subscriber's home area are automatically transferred to the area where the subscriber is located for transmission in that area. Furthermore, pages originated in any area are transferred to the area in which the subscriber is located and the area of origin can be recognized by the subscriber. Radio transmission of the page is confined to the specific area of location of the subscriber.

The number of subscribers which may be provided with the nationwide paging service is limited only by the paging code format employed. A typical binary coded paging system may use 20 bits for each individual paging code, in which case a total of 1,048,576 unique codes would be available. The total number of subscribers may therefore vary in accordance with the capacity of the specific code employed in the system. The number of local-only pagers possible in the system is virtually unlimited as a separate paging code system is employed to accommodate this grade of service and the various codes may be used repeatedly by each station. Transfer of pages between one area and another on behalf of nationwide paging subscribers is achieved by data transmission operated in a store-and-forward mode. The system may be optimized at any time by inclusion of transit stations which operate the system in a trunk configuration.

The foregoing are some of the major features which jointly provide sophisticated, continuous service previously unobtainable by radio paging subscribers.

CODE TRANSLATION

The system employs three basic codes relating to the radio pages, i.e. subscriber identification: (a) subscriber's telephone number; (b) local five-tone sequential code; and (c) nationwide binary pager code. These three codes are arbitrarily related throughout the system and have no numerical relationship whatever.

In a simple conventional automatic radio paging system using radio paging receivers activated by five-tone sequential paging addresses, codes (a) and (b) are related as follows. A typical commercially used five-tone sequential system commonly has 100,000 possible code combinations; therefore, 100,000 radio paging subscribers may be served by such a system. If the radio paging control terminal (paging terminal) is interfaced at trunk level with the land telephone system, at a level in the exchange whereby the final five digits of the dialed subscriber number are impulsed into the terminal, a total of 100,000 number combinations are also possible. It may be seen, therefore, that any telephone number with the last five digits 00000 through 99999 may be related to any one of the 100,000 five-tone sequential paging codes. A numerical relationship is not necessary, the only limitation being that of duplication. Similarly, a twenty-bit binary code has 1,048,576 possible combinations, i.e. codes. Thus, if 1,000,000 codes were used in a system employing binary addressing, a twenty-bit binary code would be required. It is therefore possible to relate the 100,000 available five-tone sequential codes to any 100,000 codes from the 1,000,000 binary codes available in the system.

If n stations have 100,000 five-tone sequential codes available they may either use all 100,000 for local service on a non-interfering basis; or they may use somewhat less than 100,000, e.g. 90,000, and reserve the remaining 10,000 codes for remote use as binary codes. Since the remote codes cannot overlap, the maximum number of stations which could participate in the latter scheme would be ten. Although the same 10,000 five-tone codes may be recovered by all ten stations for conversion to binary code, none of the codes need conflict. For example, all stations may reserve the five-tone sequential codes 80,000 through 99,999 for conversion to binary code. Station 1 may convert its codes to binary codes 000000 through 009999 and station 2 may convert its codes to 010000 through 019999 and so on for all ten stations. Thus the codes do not conflict. Furthermore, if a seven digit telephone number is used to activate the paging system and alert a specific pager, it may be seen that telephone numbers with the same final five digits may be used over at all stations; provided that either or both of the first two digits of the telephone numbers are different.

The system of the present invention makes use of the foregoing arbitrary code conversion as a basis for its operation. Throughout the system there are two grades of service available to paging subscribers: (a) Local only paging; and (b) Nationalwide paging. Those subscribers who have local-only paging service may only operate in the service area provided by the station at which they are registered. The radio paging receivers are addressed by five-tone sequential codes. Those subscribers who have nationwide paging facilities may operate freely anywhere throughout the system in any area wherein service is provided by a participating station. The radio paging receivers used by nationwide subscribers respond to binary coded addressing. It should be noted that other basic codes, combinations and conversions may be employed to give equal results, including, but not limited to, multi-tone signalling with preamble, addressing, etc. The foregoing coding formal is used only as a basis for explanation of the operation of the system. In this case the local-only paging is carried out by tone-modulated radio transmission and the nationwide paging is achieved by frequency shift keying of the same transmitter employing the basic carrier frequency. It may be seen, therefore, that the binary codes may be completely separated from the five-tone sequential codes if desired; however, in this explanation they are not separated inasmuch as a single paging terminal may be used to provide telephone number-to-five-tone conversion for all subscribers registered to a particular station, as shown in the block diagram of a base station in FIG. 3.

Figure 3:
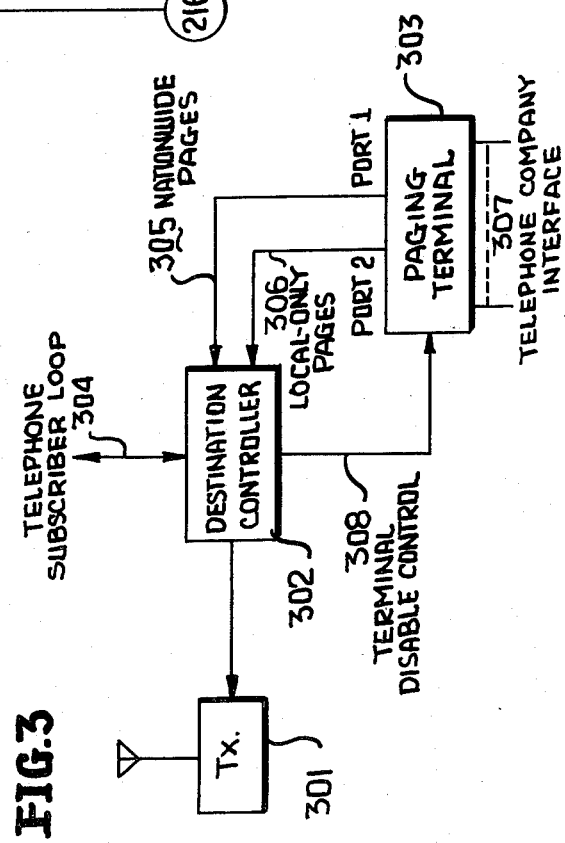
FIG. 3 is a functional block diagram of a satellite or directly interactive base station employed in the system of FIG. 2 and FIG. 1.

Referring to FIG. 3, the telephone calls by which the pages are originated are received by the paging terminal 303 from the telephone company interface 307. The terminal is programmed so that the telephone numbers corresponding to five-tone codes for subscribers with local-only service produce the code at port 2 of the terminal; whereas the telephone numbers corresponding to subscribers with nationwide paging service result in a five-tone code at port 1 of the terminal.

A common radio transmission frequency is assumed throughout the system as a basis for this explanation, and the paging stations are assumed positioned geographically so that they do not interfere with one another. Different frequencies may be used at adjacent stations if automatic frequency changing is provided for in the nationwide paging receivers.

PAGING SUBSCRIBER FACILITIES

The service available to subscribers with local-only paging service is self explanatory and is currently available in prior art systems. The facilities available to subscribers with nationwide paging service are as follows: (a) paging service may be transferred from one location to another by a local telephone call at will; (b) all pages originated anywhere within the system are transferred to the area where the subscriber is located; (c) pages originated while the subscriber is in transit are stored and then transferred to the area to which the subscriber has relocated when paging is reinstated on his arrival; and (d) the subscriber may identify the area of origination of any page received.

A nationwide paging subscriber is allotted a unique six digit number corresponding to his twenty bit binary paging code in the 1,000,000 nationwide subscriber paging system. This six digit number is preferably the direct decimal equivalent of the twenty bit binary paging code so that further code translation becomes unnecessary. It is, of course, possible to use an arbitrary relationship but this would necessitate a further step of code translation in the system control equipment. A further two digits are given to the subscriber which indicate whether the paging service is to be suspended or reinstated; these last two digits are common to all nationwide subscribers. The system could be made to operate without these two digits as the use of the other six digits would normally indicate if the subscriber intends to suspend or reinstate his service. However, if the six digits were used incorrectly the opposite condition could occur unbeknown to the subscriber.

When a subscriber wishes to suspend his paging service prior to travelling to another location, he first dials a predetermined telephone number to access the station. On receipt of the answer tone he dials his unique six digit number followed by the "suspended" digit; the system then suspends all paging to that subscriber, stores pages during the suspension period, and transfers all stored pages and pages originated thereafter to the subscriber when paging is reinstated.

If a telephone instrument with a rotary dial is used to enter the above seven digits after accessing the station by means of a local call, special facilities must be provided by the interconnecting telephone company to repeat the required seven digits. Although this is possible it may not be very practical in many areas. Thus the following explanation assumes the use of Touch Tone type dual-tone-multi-frequency (DTMF) signalling to provide end-to-end communication once the call is set up.

When the subscriber reaches his destination he makes another local telephone call to access the station in that area. Upon receipt of the answer tone the subscriber then dials his unique six-digit number plus the reinstate number. Paging is then resumed and any pages originated during the time paging was suspended are forwarded to the new station and transmitted in the new area. Subsequent pages are transferred to the subscriber in that area until paging is again suspended and received in another area.

If the subscriber forgets to suspend paging when departing from one area to another, paging may be transferred by making a single local telephone call on arrival at his destination, entering the unique six-digit number followed by the reinstate code. The system automatically transfers the subscriber's paging service to that area but any pages originated for that subscriber while he was in transit are lost.

Commercially available binary coded radio paging receivers are used for the system explanation. These receivers have the capability to receive and decode binary address suffixes and store these temporarily in a memory for display in numerical form on a digital readout, as required by the subscriber. The system makes use of the latter facility to identify the area where the page was originated.

SYSTEM CONFIGURATION

Figure 1:
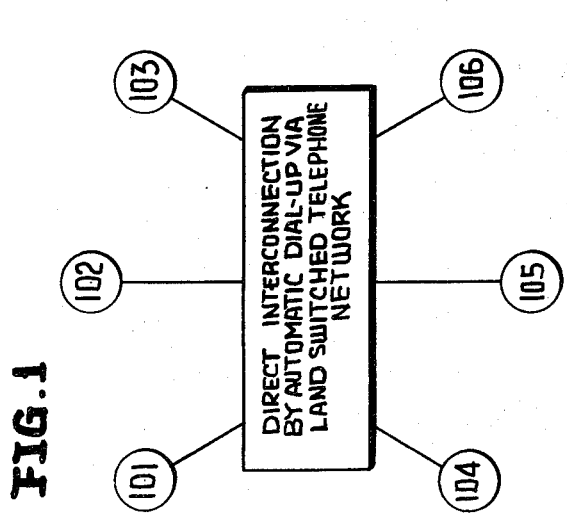
FIG. 1 is a functional diagram illustrating interaction of paging stations in a simplified version of the present invention.

The essential functional units of a system providing nationwide paging and local only paging service are shown in FIGS. 1 and 2. All participating base stations 101 through 106 shown in FIG. 1 are directly interactive with each other. FIG. 2 shows a more sophisticated system operating in a trunked mode; hence a number of stations 201, 202 and 203 are designated as transit stations. Each transit station serving a number of satellite stations 204–207, 208–212, and 213–216. All paging subscribers operating in the system are registered at one of the base stations shown in FIG. 1 or at one of the satellite stations shown in FIG. 2, for billing purposes.

FIG. 3 illustrates the basic functional units of a base station which may be used in the system configuration shown in FIG. 1 or as a satellite station in the configuration shown in FIG. 2. The paging terminal 303, in the form of a commercially available automatic radio paging control terminal, controls the emission of local-only pages by the transmitter 301. The paging terminal 303 is used to verify all paging calls originated via the telephone company interface 307 for all subscribers registered at that station. When the paging terminal is used in a normal radio paging system, which serves only the area in which the base station is located, the paging code formed by the terminal in response to a call is transmitted directly to the subscriber by the transmitter. The destination controller 302 would not exist in this case and the paging terminal would be connected directly to the transmitter by wire line or other suitable means.

In the case of the nationwide paging system described herein the paging codes generated by the paging terminal 303 are divided into two distinct groups. One group of codes is reserved for those subscribers who require local-only paging. These codes are programmed in the terminal to appear at port 2 and line 306. The second group of codes is reserved for subscribers who require nationwide paging and extended local paging. These codes will appear at port 1 and line 305 in FIG. 3. It should be noted that the nationwide page codes appearing at port 1 are only those for subscribers locally registered with that specific base station and are provided in response to pages locally originated via the telephone company interface 307. Other nationwide pages transferred from other areas for subscribers temporarily located in the area, i. e. in a roaming mode, are not handled by the paging terminal 303 at this location.

Both nationwide and local-only pages from ports 1 and 2 are handled by the destination controller 302. The local-only pages are directly gated to the transmitter 301 via the destination controller 302 provided the transmitter has not been seized by the destination controller for transmission of nationwide pages. If the transmitter is in the seized condition when a local-only page on line 306 is generated, the paging terminal port 2 becomes temporarily disabled by a signal on line 308 from the destination controller.

As described above under SIGNALLING, the local-only pages modulate the transmitter with a five-tone sequential code in accordance with the selected coding and modulation scheme. Locally originating nationwide pages appear on line 305 from paging terminal 303, and are fed to the destination controller. The destination controller determines, from information held in its circuitry, if the page is to be transmitted locally or transferred to another area, depending on the whereabouts of the subscriber. If the page is to be transmitted locally, the destination controller 302 converts the five-tone sequential code produced by the paging terminal 303 into a basic binary code which is unique to the nationwide subscriber. This code is converted into the necessary binary format for transmission, complete with preamble, if required, and error corrections and parity bits as necessary. The destination controller seizes the transmitter 301 if it is in the idle condition and modulates it so that the resulting transmission takes place in the FSK mode. If, however, the nationwide page is not for local transmission, i.e. it must be transferred to another area, the initial code translation results in a basic binary code; for example, 20 bits would be required to identify any pages in a system with one million subscribers. The destination controller then stores the page for a short predetermined period of time with other pages destined for the same area. In the case of the simple system shown in FIG. 1 wherein all stations are directly interactive, at the end of the storage period the destination controller seizes the telephone subscriber loop 304 and automatically obtains access to the land switched telephone network. The destination controller at the remote base station in question is accessed via its telephone subscriber loop by means of automatic dial up from the originating destination controller 302. When the called area's destination controller answers, the group of stored pages in binary format are transmitted via commonly used data transmission techniques. The pages are then transmitted in the area of the recipient base station.

It should be noted that the storage period prior to transfer of pages to another area is normally limited to a few minutes only to avoid delays in receipt of pages. However, the storage period is normally interchangeable with compilation of a preset number of pages, particularly where the switched telephone network is used as the interarea transmission medium. The system then retains pages in the destination controller 302 for a predetermined time period or until a given number of pages have been compiled for a given destination, whichever occurs first; then the pages are transferred to the required remote area as described above. The maximum time period is determined by the maximum delay in transmission of a page by the system, which is the sum of the system delays of which the foregoing time period is one. Conversely the maximum number of pages to be stored prior to transfer is a function of the minimum billable holding time from the interconnecting telephone company, the word length in bits of each page including ancilliary information, bits, etc., and the data transmission dates, to wit:

$$P\,max = \frac{(B - pr) \times H_{min}}{W} \quad (1)$$

where: P max=maximum number of pages which may be stored prior to transmission to any single destination; B=data transmission speed in bits/sec.; pr=handshake protocol between modems and any message preamble plus the maximum telephone system disconnect delay; $H_{min}$=minimum holding time billable on any call by the telephone company in seconds; and W=word length for each page in bits. Furthermore, the system may be operated to take advantage of additional telephone company billing for time units at a lower cost than the initial unit, in which case equation (1) will vary in accordance with the applicable tariff structure.

In the case of the trunked system shown in FIG. 2 which makes use of transit stations 201, 202, 203, etc., the transfer of pages from area to area requires more than a single telephone connection. Thus, in this case, the destination controller at all stations, including the transit stations, append a destination code to all nationwide pages to be transferred. In this case the code is in binary format in keeping with the formatting selected for this description. It should be noted that other codes and transmission modes than binary and digital data transmission may be had for intercommunication between stations if so required.

In the case of a page originated for a subscriber at his home station, for example, satellite station 205 in FIG. 2, but where the subscriber is presently located in the area served by station 212, the following basic sequence would apply. The page causes the paging terminal 303 to generate a five-tone sequential page on line 305. The destination controller 302 at the home station 205, FIG. 2, converts the page into the subscriber's unique code in the nationwide paging coding scheme, in binary code. The destination controller then recognizes that the required subscriber is presently located in the area served by station 212. The page is then stored with other nationwide pages in similar format for a short time period until an economic number of pages have been compiled or a maximum time delay has expired. The destination controller 302 then accesses the land switched telephone network via the telephone subscriber loop 304 and automatically dials up the transit controller 404 at the transit station 201 via the telephone subscriber loop 409, FIG. 4 (the functional block diagram of a transit station). When the transit station transit controller 404 answers, the pages are transferred by means of the data transmission to transit station 201.

The transit controller at transit station 201 tests the received page codes to determine if they are intended for local radio transmission by that station 201; it also tests to determine if the received page code is intended for any of the other satellite stations 204, 206, 207, controlled by transit station 201. The transit controller also tests the page codes and determines which transit station controls the satellite station for which the page is destined. A destination code is appended to the page which is then entered into and held in a stack with other pages on a time or quantity basis as previously described for onward transmission to the required transit station 202.

At the appropriate time the transit controller 404 seizes the subscriber loop 409 and obtains access to a similar transit controller at transit station 202, FIG. 2, by automatic dial up via the land switched telephone network. The transit controller at transit station 202 receives the transferred pages and tests the destination codes for further inter-transit station transmission. This latter test may be omitted in a situation where a small number of transit stations all have direct access to each other. Pages having a code requiring further transmission are held in the transit controller for onward transmission to another transit station transit controller.

The page destined for satellite station 212 is passed to the destination controller at transit station 202 where the destination code is interrogated. The page is then entered into a stack with other pages for transfer to satellite station 212. The transmission of this group of pages is delayed as before on a time or quantity basis for economic transfer.

The destination controller at the transit station 302 obtains access to the land switched network via its telephone subscriber loop 407 and calls the destination controller at satellite station 212 by means of automatic dial up. The page is transferred with the others in the group and the destination controller at station 212 then formats each page as required for binary transmission by the transmitter 301. It should be noted, that for all interstation communications full duplex transmission of data is possible, where the switched telephone facilities permit, and half duplex otherwise, but the minimum telephone connection time is not fully occupied. In each case it is possible to transmit traffic in both directions as a matter of economy in interstation communications.

The basic data requirements for billing are automatically generated by the system. Each subscriber with nationwide paging facilities is allocated a unique code. As each paging code is assigned a home station, identification of subscribers who receive pages and the stations to which they belong are easily determined. A time and date code may easily be added if this information is required.

INTERSTATION MESSAGE CODING

A set of four standard message formats, as illustrated in FIGS. 5, 6, 7 and 8, are used in operation of the trunked system of FIG. 2. Two standard message formats shown in FIGS. 10 and 11 are used in the operation of the simple system with all interaction stations as illustrated in FIG. 1. The length of the origin code in either system application is a function of the total number of stations in the system. In both cases the code is a binary number. Thus, for a system having 256 stations or less an 8 bit code would be adequate; for a system having up to 4096 stations a 12 bit code would be applicable; etc. These codes are used in all interstation communications. The illustrated codes are described in the course of the system description set forth below.

DESTINATION CONTROLLER CONFIGURATION

Figure 13:
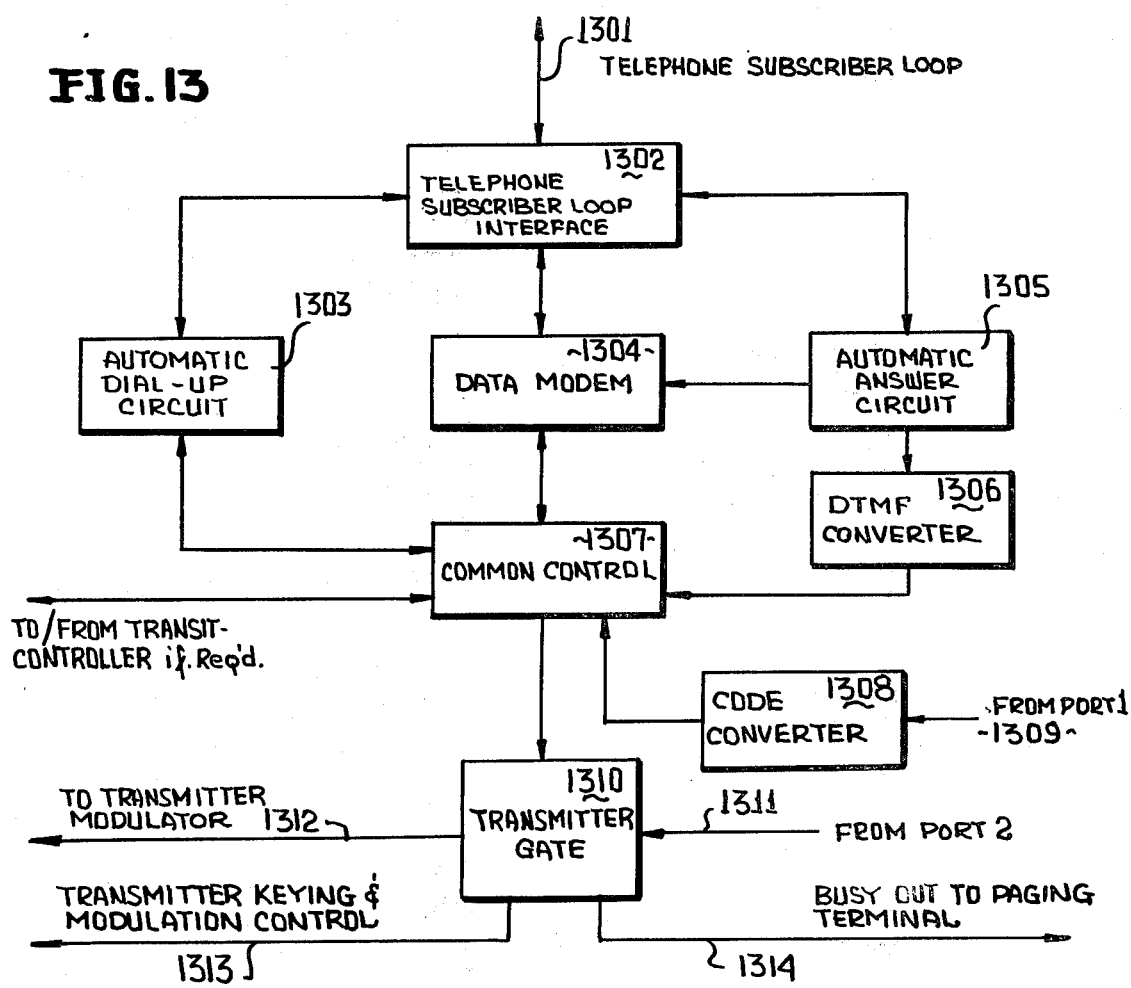
FIG. 13 is a functional block diagram of the destination controller of FIG. 4.

The functional elements of the destination controller 302 are shown in FIG. 13. The telephone subscriber loop interface 1302, the automatic dial-up circuit 1303, the data modem 1304, the automatic answer circuit 1305 and the DTMF decoder 1306 are conventional commercially available items. The remaining circuit blocks, namely, the common control 1307, code converter 1308 and the transmit gate 1310 are made up of standard commercially available logic integrated circuits (IC's) analog IC's and discrete components. All devices used therein are readily commercially available items. The destination controller common control 1307 equipment is shown in greater detail in FIG. 15. The circuit is controlled by standard 8-bit microprocessor 1510. Microprocessors of other dimensions, such as 12- or 16-bit units would operate equally well with the necessary equivalent 12- or 16-bit supporting circuitry. The program read only memory (ROM) 1506 and registered subscriber ROM 1507, may be either standard masked programmed, or programmable read only memories. The four random access memories (RAM's) 1505, 1512, 1513 and 1528 are static RAM's. The fifth RAM, the billing and record keeping RAM 1522, is a dynamic RAM because of the required storage capacity. The RAM refresh circuitry 1523 is the standard type used with dynamic RAM's, examples of which may be found in most component manufacturer's data manuals. The direct memory access circuit (DMA) 1511, is part of a standard commercially available integrated circuit designed specifically for this purpose. The date and time clock 1524 makes use of a standard 24-hour clock IC with month and day readout; day and month corrections are accomplished by a small read only memory. The readout from this circuit is in binary coded decimal (BCD) format with minutes, hours, day and month. The clock circuit 1508 is a crystal controlled square wave oscillator supplying the necessary outputs for the microprocessor requirements. The buffer circuits 1503, 1504, 1509, 1514, 1515, 1525 and 1526 may be either undirectional or bidirectional data bus buffers commonly commercially available. The address lines from the microprocessor to the various supporting circuits are not shown for the sake of preserving clarity; their operation is self-explanatory.

TRANSIT CONTROLLER CONFIGURAION

Figure 14:
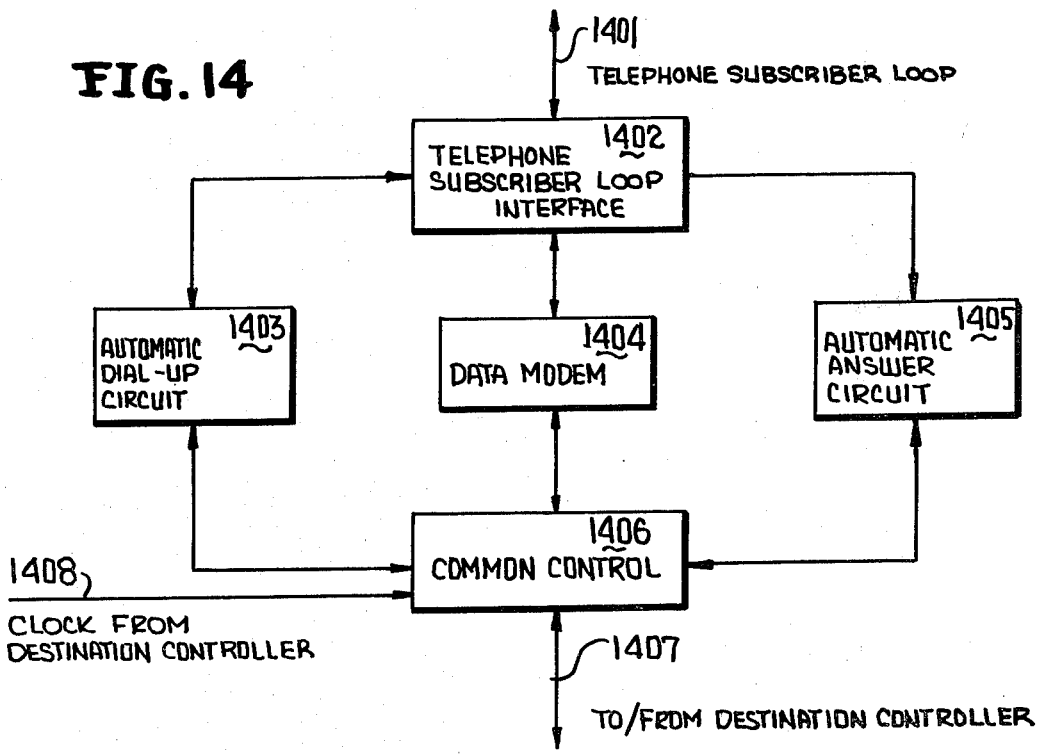
FIG. 14 is a functional block diagram of the transit controller of FIG. 4.

FIG. 14 shows a functional block diagram of the transit controller 404. The telephone subscriber loop interface 1402, the automatic dial up circuit 1403, the automatic answer circuit 1405 and the data modem 1404 are commonly used commercially available units. The common control equipment 1406 is a microprocessor controlled unit made up of commercially available logic IC's.

FIG. 16 is a detailed block diagram of the functional circuits contained in the transit controller common control unit 1406. Microprocessor 1610 is a commercially available 8-bit microprocessor circuit. As in the destination controller, the microprocessor could equally well be a 12-bit, 16-bit or other microprocessor with the necessarily correctly dimensional supporting circuitry. The program ROM 1609, and the page routing ROM 1620 may be either masked programmed ROM's or programmable ROM's (PROM's) as desired. The operating RAM 1608 is a static RAM and the remaining RAMS 1611, 1612 and 1616 are dynamic RAM's because of their required storage capacity. The RAM refresh circuits 1615 and 1617 are standard circuits, examples of which may be found in most competent manufacturers' data manuals. The direct memory access circuit (DMA) 1613 is part of a commercially available IC designed specifically for that purpose. The buffers 1602, 1604, 1607 and 1618 are commercially available unidirectional or bidirectional data bus buffers. The location RAM 1616, is an expandable circuit by addition of further memory cards containing the necessary memory IC's and support circuitry. The overall RAM arrangement permits addressing of 1,000,000 bytes of 'n' bits, the byte length being the binary code length of the origin code shown in FIGS. 5, 6, 7, etc. The location RAM 1616 may be expanded conveniently as the number of subscribers in the system increase.

SYSTEM OPERATION

The following description is based on a trunked system as illustrated in FIG. 2.

SUSPENSION OF PAGING SERVICES

When a nationwide paging subscriber presently located in the area served by his home station wishes to move to another area the following sequence occurs. The subscriber obtains access to the station destination controller (FIG. 13) by dialing a local telephone call. The subscriber loop 1301 is accessed whereupon the automatic answer circuit 1305 responds by simulating a telephone "off hook" condition and returns a 100 ms audible answer tone burst. The subscriber enters his six-digit unique number via Touch Tone followed by the "paging-suspend" digit. The DTMF converter 1306 converts the digits into BCD format and passes them to the common control unit 1307. When the automatic answer circuit 1305 simulates the "off-hook" condition and the data modem 1304 does not receive a carrier frequency from a corresponding modem at a distant station, circuit 1305 automatically disables itself.

Figure 15:
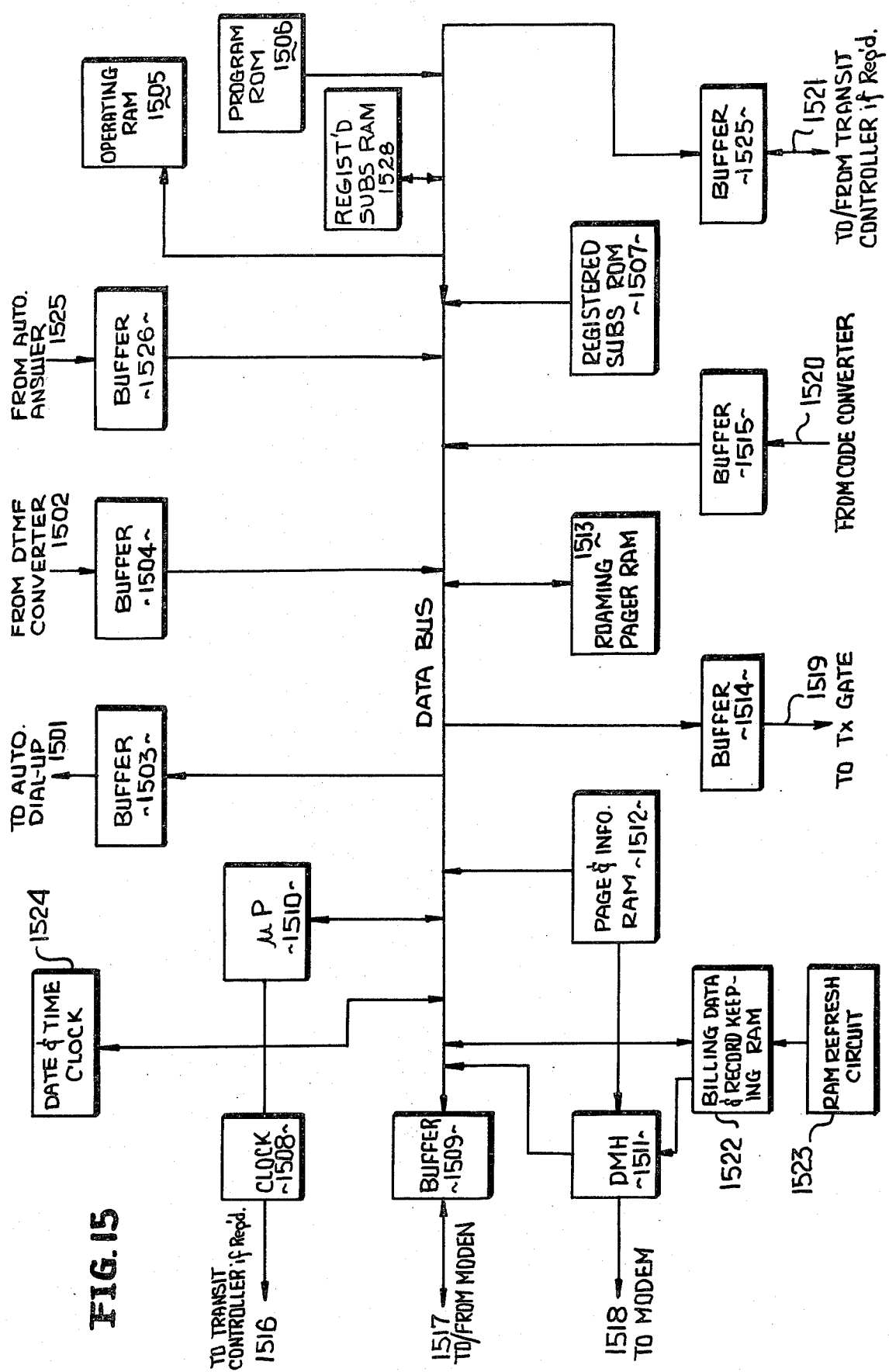
FIG. 15 is a functional block diagram of the common control unit for the destination controller of FIG. 13.

The seven BCD digits are passed to the microprocessor 1510, FIG. 15 via buffer 1509. The microprocessor immediately performs a BCD to binary conversion in the first six digits and stores the seventh digit in an internal register. The microprocessor 1510 compares the 20-bit binary code resulting from the BCD conversion with the contents of the registered subscriber's ROM 1507. There is a match if the subscriber is registered at this particular station because the pager code is stored in ROM 1507 in 20-bit binary format. The registered subscriber's location is addressed in the registered subscriber's RAM 1528. With reference to FIG. 17, the 2-bit code 1702 in RAM 1528 is set to "01" thus indicating that paging has been suspended.

FIG. 17 shows the data format for each subscriber in the registered subscriber's RAM 1528. The number of memory bytes allocated to each subscriber is a function of the maximum number of pages which may be held for a subscriber while paging is suspended. The practical maximum is dictated by the number of page-origin codes the paging receiver can store at one time because, when the service is reinstated, all stored pages are transmitted serially. In practice, the number of origin codes to be stored is a small number, less than ten, in order to minimize the size of the memory while still providing acceptable service. The two least significant bits are used in byte 1 for the 2-bit code as described above. The least significant bit (LSB) is used in byte 2 to indicate whether a page has been originated locally while service was suspended. The second bit next to the LSB in byte 2 is not used and is thus set to binary; the two LSB's are not used in the remaining bytes. Bytes 1 through n contain any pages for the subscriber originated other than through the home station while paging service was suspended. The local origin code is not stored. More than one page originated via a single remote station causes only the origin code to be entered into RAM 1528.

In the case of a nationwide subscriber who is operating remotely from his home station and wishes to suspend paging, the following sequence is applicable. The destination controller 402 at the station where the subscriber is operating is accessed by a local telephone call in the same manner as described above. The dix-digit unique subscriber code is entered into the system along with the suspend digit. Microprocessor 1510 performs the necessary BCD to binary conversion and compares the 20-bit binary code to the codes in the registered subscriber ROM 1507; then, on establishing that the subscriber is not locally registered, compares the code with those stored in the roaming paper RAM 1513. A match is found since the 20-bit pager code was stored in the roaming pager RAM 1513 when paging service was reinstated at that station.

The arrangement of the roaming subscriber RAM 1513 is similar to that of the registered subscriber RAM 1528 except that the 20-bit pager code occupies bytes 1 and 2 with the 10 lowest order bits in byte 1 and the 10 highest order bits in byte 2. This is done because it is unlikely in a practical system that a binary code larger than 12 bits, total codes 4096, will be used for origin codes. The two least significant bits in byte 1 are used as a 2-bit control code in a similar manner as that used with the registered subscriber RAM 1528. The code is as follows: Code 00—Operational; Code 01—Service suspended; Code 10—Not used; and Code 11—Service suspended, locally originated page held. The remaining memory bytes 3 through n contain page origin codes as may be required. The two LSB's in bytes 2 through n are not used and are set to binary 0.

Roaming pager codes are entered into RAM 1513 in the order in which they are transferred to the station; therefore, a memory location may not be addressed, as in the registered subscriber RAM 1528, by using the 20-bit binary code. All codes must be tested until the required one is found.

When microprocessor 1510 locates the subscriber's pager code in the roaming pager memory 1513, the 2-bit code is set to 01 thus indicating that service has been suspended. If a page is locally originated during the time paging is suspended, the 2-bit code is set to '11'. Origin codes of pages originated elsewhere are stored in bytes 3 through n similarly to those stored in the registered subscriber RAM 1528.

REINSTATEMENT OF PAGING SERVICE

When the subscriber arrives at his destination he initiates a local telephone call, similar to that described above, and enters his unique six-digit number plus the reinstatement digit. Microprocessor 1510 in the station's destination controller performs the necessary BCD to binary conversion and compares the 20-bit code to the codes in the registered subscriber's ROM 1507. If the subscriber is registered at that station, i.e. it is his home station, the 2-bit code is set to 00 indicating local operation. The remainder of the subscriber's memory location is empty; i.e. all other bits are set to logical 0. If, however, the subscriber is not registered at that station, the 20-bit pager code is stored in the roaming pager memory 1513 and the 2-bit code is set to 00, indicating that the pager is now operational. In either case the microprocessor 1510 formulates a message similar to the one illustrated in FIG. 5 from the 20-bit binary pager code and the 2-bit control code 502 which is set to '10', indicating that paging service has been reinstated at that station. The local page mark is set to binary and the complete message is stored in the next available location in the page and information RAM 1512. A similar message plus a time and date code obtained from the time and date clock 1524 is entered into the billing data and recording keeping RAM 1522.

When the page and information RAM 1512 contents reach a predetermined level or a predetermined time period expires, whichever comes first, microprocessor 1510 initiates automatic dial-up of the controlling transit station 201, 202, 203, etc. If the station involved happens to be a transit station the microprocessor accesses the transit controller (FIG. 14) via the buffer 1525 (FIG. 15) and line 1521. In either case the transit controller processing is the same. In the case where automatic dial up is used, data modem 1304 (FIG. 13) to data modem 1404 (FIG. 14) contact is established and the contents of the page and information RAM 1512 are transmitted to the transit station via the DMA circuit 1511. The modem at the satellite station identifies itself automatically to the transit station modem and vice versa, at the commencement of communications as part of the standard protocol. The modem 1404, at the transit station precedes the information fed to the common control with the satellite origin code. The stop code 505 (FIG. 5) is inserted in the message by microprocessor 1510 after each message is stored in the page and information RAM 1512. This code assures that the receiving equipment will be able to separate the messages which are transmitted serially and are frequently of unequal lengths.

The data modem 1404 (FIG. 14) passes the messages to the microprocessor 1610 (FIG. 16) via buffer 1607. All messages are temporarily stored in the operating RAM 1608 as they are received. The microprocessor processing speed is high compared to the data speed employed between stations so that there are comparatively long time intervals between each parallel 8-bit byte of information received from the modem. The microprocessor therefore waits until the first message has been completely received and then commences processing in the intervals between each byte offered by the modem; the second message being stored in the operating RAM 1608 at the same time. Processing of the first message is completed by the time the second message has been received. Thus the third message may replace the first message in the operating RAM and so on. The origin code of the station from which the message was received is also stored in operating RAM 1608.

The microprocessor 1610 (FIG. 16) first tests the two-bit control code. The binary code 10 indicates that paging has been reinstated at the station from which the message was received. The microprocessor next accesses the subscriber's location in the location RAM 1616. This is accomplished by use of the 20-bit binary pager code which serves as a direct memory address. The station which serves the subscriber until relocation is represented in the location RAM as a binary station code. That code is read from the location RAM 1616 and is used directly as the destination code 603 (FIG. 6) in the compilation of a message. The location code taken from the location RAM 1616 is replaced by the origin code from the operating RAM 1608 as this now represents the station location wherein the subscriber is operating. The formulated message is now complete. The microprocessor now determines the routing required to transmit the message to the original station. This information is derived from comparison of the destination code 603, with the codes stored in the page routing ROM 1620. The message is then stored in one of the page and information RAM's 1611 through 1612 which corresponds either to the next transit station or one of the satellite stations associated with the particular transit station being described. A second message, similar to that illustrated in FIG. 8, is formulated by adding the origin code from the operating RAM 1608 and setting the 2-bit control code to binary 11. This message is stored in all page and information RAM's 1611 relating to other transit stations.

As the contents of each page and information RAM 1611 reach a certain point, or a predetermined time period expires, whichever occurs first, the microprocessor accesses modem 1404 (FIG. 14) and automatic dial-up circuit 1403 and establishes communications with the acquired stations. The particular page and information RAM wishing to transfer its contents does so using the direct memory access circuit (DMA) 1613 to connect it to the data modem 1404 (FIG. 14). In the case of messages for the destination controllers located at the transit station, the transfer is made using the DMA 1613 and buffer 1618.

Transmission of the message to the next transit station is similar to that previously described. The receiving transit station will recognize the message as an inter-transit station transfer; therefore, somewhat less processing ensues. The 2-bit control code is tested and, upon recognition of the code and a reinstatement code, microprocessor 1610 reads the destination code and obtains the necessary routing information from the page routing ROM 1620. In addition, the microprocessor places the message into the correct page and information RAM 1611, 1612. Further processing is not required. The message is transmitted to the correct satellite station destination controller at the appropriate time.

A second message is received by the transit station, namely, the location memory update message of FIG. 8. Processing time for this information is also very short. The 2-bit control code being set to binary 11 determines the purpose of the message. The 20-bit binary pager code is used as a direct memory address for the pager code location in the location RAM 1616. The location code 803 is stored in the appropriate location. This process is performed by all transit stations receiving this message format.

When the reinstatement message is received by the transit controller of the station where paging for the subscriber being described is suspended, it is stored temporarily in the operating RAM 1505 (FIG. 15) while it is processed. Microprocessor 1510 ascertains the reason for the message from the 2-bit control code and then compares the 20-bit binary pager code with those stored in the registered subscriber's ROM 1507. If the subscriber is locally registered, the registered subscriber RAM 1528 is read to see if any pages have been stored during the period of paging suspension. If so, a message will be formulated.

It should be noted at this point that if the subscriber neglected to suspend his paging service when he relocated but made the necessary reinstatement code on arrival at his destination, no pages would have been stored but the 2-bit control code 602 (FIG. 6) from the received message would be directly entered into the 2-bit control code location 1702 in the registered subscriber's RAM 1528. This automatically causes the subsequent pages to be transferred.

If the subscriber is not registered at this station, the roaming paper RAM 1515 is read and pager codes are compared with the 20-bit pager code received as part of the message. When the match is made, any pages stored at that location in memory are formulated into a message similar to that illustrated in FIG. 7. The location occupied by the subscriber in the roaming pager RAM 1513 is then cleared.

The messages formulated by stored pages for a locally registered subscriber, or a roaming subscriber who was temporarily registered at the station, are the same. The 20-bit paging code with the 2-bit control code is set to binary 00, indicating that the message is a page, and the destination code position 703 is set to all binary 0. The origin code of the station is inserted into the origin code 1 position 704 if any pages have been locally originated. The remaining origin codes are added to the message in position 705 as illustrated in FIG. 7. The message is then stored in the page and information RAM 1512, complete with stop code 706. A similar message is entered into the billing data and record keeping RAM 1522 with a date and time code obtained from the date and time clock 1524. The message is transferred to the transit station, as previously described, at the appropriate time.

Upon receipt of the above-described message, the transit station adds the destination code 703 (FIG. 7), which is obtained by microprocessor 1610 from the page counting ROM 1620. The message is then placed in the appropriate page and information RAM 1611, 1612, for transmission. Processing is similar to the foregoing at the second transit station.

Upon receipt of the message at the destination station, the microprocessor 1510 recognizes that the message is a series of pages from the 2-bit control code 702 (FIG. 7). The microprocessor moves the message from the processing location in the operating RAM 1505 to a temporary storage location in the microprocessor memory. This is to permit further use of the memory locations for message receipt if there is a delay in seizing the transit gate 1310 (FIG. 13). The microprocessor 1510 attempts to seize the transmit gate 1310; at the same time it commences conversion of the message into the binary paging format required for activation of the radio paging received. If the paging receiver can decode the paging code and receive a number of origin codes serially in one message, the microprocessor formulates the page in that manner, complete with error detection, correction and parity bits. If, however, the radio paging receiver requires each origin code to be transmitted as a separate page, microprocessor 1510 must be programmed accordingly.

The microprocessor accesses the transmit gate 1310 via buffer 1514 and activates the transmitter, also selecting the correct modulation mode for the page transmission. The radio paging receiver receives and decodes the page information and displays all origin codes required on the digital readout.

LOCALLY ORIGINATED NATIONWIDE PAGES

As previously described, pages for nationwide subscribers appear at port 1 of the local paging terminal 403 (FIG. 4). These pages, in five-tone sequential format, are fed to the code converter 1308 (FIG. 13), where they are converted into 20-bit binary codes. Each 20-bit binary code is fed to the destination controller microprocessor 1510 via buffer 1515. Microprocessor 1510 compares the 20-bit code to those contained in the registered subscriber's RAM 1507 and when a match is found the registered subscriber RAM 1528 is accessed. The 2-bit control code (FIG. 17) is the designated location in the RAM indicates the condition of the subscriber's paging service. If the subscriber is operating locally the control code is set to binary 00 and the remaining memory locations associated with the subscriber are all set to 0. Microprocessor 1510 then compiles the 20-bit binary code into the necessary format for radio transmission to the subscriber and appends the local origin code. The basic 20-bit binary code, local origin code, and a time and date code from the time and date clock 1524 are entered together into the billing data and record keeping RAM 1522. The microprocessor now accesses the transmit gate 1310 (FIG. 13), as previously described for transmission of the page to the subscriber.

When a subscriber is operating remotely in an area other than that served by his home base station, the following sequence occurs. The page appearing at part 1 is converted into a 20-bit binary code and compared with codes in the registered subscriber ROM 1507, as previously described. When the registered subscriber's RAM 1528 is read the 2-bit control code 1702 (FIG. 17) is found to be set to binary 10, indicating remote operation. The microprocessor then formulates a message consisting of the 20-bit binary pager code 501 (FIG. 5), a 2-bit control code 502 set to 00 indicating that the message is a page, and one local page mark 503 set to binary 1. This message is entered into the page and information RAM 1512 complete with stop code 504 for onward transmission to the associated transit station as previously described. The 20-bit pager code, the 2-bit control code, the local origin code and a date and time code are entered into the billing data and record keeping RAM 1522.

When the above message is received at the transit station the microprocessor 1610 (FIG. 16) inspects the 2-bit control code and recognizes the message as a page. The microprocessor then ascertains the whereabouts of the subscriber from the location RAM 1616 and adds a destination code 703 along with the originating station's origin code 704 which was derived from the data transmission between stations. The local page mark 503 is removed. Microprocessor 1610 accesses the information in the page routing ROM 1620 to select the correct page and information RAM 1611, 1612, in which to enter the message complete with stop code. The page is transferred to the required station, via a further transit station as necessary, to be transmitted to the subscriber as previously described.

REMOTELY ORIGINATED NATIONWIDE PAGES

When a page is originated via a station other than the subscriber's home station and the subscriber is located elsewhere, the following sequence takes place. The page which appears at port 1 of the station's paging terminal 403 is converted to a 20-bit binary paging code by the code converter and is then examined by microprocessor 1510 in the station's destination controller 402. Microprocessor 1510 tests the registered subscriber ROM 1507 and, upon not finding a match, accesses the roaming pager RAM 1513. If the subscriber is operating in the area served by this station a matching code is found and a page is formulated with the station origin code for transmission locally as previously described. Data for billing is entered into the appropriate RAM. However, as assumed in the present example, the subscriber is not operating locally; therefore no matching code is found in the roaming subscriber's RAM 1513. The microprocessor then compiles a message consisting of the 20-bit binary pager code, a 2-bit control code set to 00, a local page mark set to binary 1, and a stop code as shown in FIG. 5. This message is then stored in the page and information RAM 1512 for transfer to the transit station at the appropriate time. A similar message without the local page mark, but with the local origin code and a time and date code, is stored in the billing data and record keeping RAM 1522.

When the message is received by the transit controller at the transit station, a destination code and the origin code of the originating station is affixed and the local page mark removed. The message now resembles the message illustrated in FIG. 7. Routing to the ultimate destination is performed as previously described.

BILLING AND RECORD KEEPING DATA

The billing and record keeping messages stored in the billing and record keeping RAM 1522 are transmitted from time to time to a central billing and record keeping facility. The RAM's at the various stations in the system are either polled by the central billing facilities or the destination controller accesses the facility when the RAM is a certain percentage full.

The messages contained in the record keeping and billing RAM's are formatted in accordance with FIG. 18. The 2-bit control code in FIG. 19 is similar to that used in interstation messages as shown in FIG. 9 with the addition of a single code which was previously unused. The service suspended code, binary 01, is used when it is desirable for record keeping purposes to have an indication when service was suspended for a particular subscriber. In this case a message is formulated containing the 20-bit pager code 1801, the 2-bit control code 1802 set to binary 01, the station origin code 1803, a date and time code 1805 and the stop code 1806. The foregoing description of paging service suspension did not include this message as it is not essential to the real time operation of the system; however, it may be necessary for system analysis.

The 2-bit control code binary 11 is not used in the billing and record keeping messages because it corresponds to the location memory update code (FIG. 9), used between transit stations.

ALTERNATE SYSTEM OPERATION

The foregoing system description is based on the use of a single frequency common to all stations; however, it is possible to use different frequencies at different stations as required. All interstation messages and processing by destination controllers and transit controllers is similar. The basis of this alternate mode of operation is the use of separate radio paging receivers in various areas. Radio paging receivers are normally tuned to receive a single radio carrier frequency. The operation of the alternate system is described below:

NATIONWIDE PAGER CODING

The station arrangements follow the formats illustrated in FIGS. 3 and 4, especially in that local only pages appear at port 2 and nationwide pages appear at port 1. Two methods of operation are possible in respect to pager coding. The first method follows the nationwide binary paging code scheme described above and operation proceeds exactly as described except that different paging receivers are required in various areas in order to be compatible with the various transmitted radio frequencies. The second method varies from the first in that any form of pager coding may be used for all pages, including those with local only service. The pager codes available at each station are divided into two groups. One group is allocated to those subscribers who have local-only paging service and the other to those with nationwide service. As all the codes available at one station may only be received by pagers tuned to that specific radio frequency in that area, the actual transmitted page codes may be used over and over in other areas without interference. Hence, if the subscribers with nationwide paging facilities adhere to the unique 1,000,000 binary code scheme, described above, for identification within the system, it is possible to provide full nationwide service on the basis of transmission of pages on a local basis using a restricted coding scheme.

A nationwide page for a subscriber in the system is processed in the following manner. The page appears at port 1 of the local paging terminal and is converted into a 17-bit binary code. The 17-bit code encompasses the full 100,000 codes available from a five-tone scheme. Smaller binary codes may be used in accordance with the number of five-tone codes set aside for nationwide subscribers at that station. For example, if 4,000 codes were reserved at the station, a 12-bit code may be used. This binary code is then converted by microprocessor 1510 (FIG. 15) in the station's destination controller into one of the 1,000,000 20-bit binary codes. Here, once again, the conversion is arbitrary as the two codes have no direct numerical relationship; the conversion is purely one of code assignment. The 20-bit binary pager code is then processed as previously described. If the page is to be transmitted locally to the subscriber the original five-tone sequential code is transmitted and the 20-bit binary code is used for billing and record keeping.

If the subscriber is in another area, the page is processed and transferred in binary form as previously described. The destination controller at the subscriber's location converts the page into a five-tone sequential page code assigned to the subscriber for operation through that particular station. The code conversion is purely one of assignment and the codes have no numerical relationship.

All operations throughout the system both by the subscribers and system equipment are the same as described for the primary system with the exceptions described above.

While I have described and illustrated various embodiments of my invention, it will be clear that variations of the details of construction which are specifically illustrated and described may be resorted to without departing from the true spirit and scope of the invention as defined in the appended claims.

I claim:

1. In a paging system of the type wherein multiple subscribers are each provided with a subscriber receiver which responds to a uniquely coded radio transmission by providing a perceptible indication that the subscriber is being paged, and in which each subscriber is assigned to a home station which transmits said radio transmission throughout a prescribed geographic area served by that station, a method comprising the steps of:

responding to a predetermined command originating from at least one of said subscribers by automatically transferring page data subsequently received at said home station of said one subscriber to a further station which serves a further geographic area;

for each page intended for said one subscriber and for which page data is received at said further station, transmitting from said further station the uniquely coded radio transmission to which the receiver of said one subscriber responds; and automatically suspending transmission of uniquely coded radio transmissions intended for a subscriber by the home station of that subscriber in response to receiving a suspend command from that subscriber.

2. The method according to claim 1 further comprising the step of:

automatically storing page data relating to pages for a subscriber for whom transmissions are suspended whenever transmissions are so suspended.

3. The method according to claim 2 further comprising the step of:

responding to a reinstate command received from a subscriber for whom transmissions have been suspended and for whom page data is stored by automatically transmitting a uniquely coded transmission to that subscriber from whatever station serves the geographic area from which said reinstate command originated.

4. In a nationwide paging system of the type wherein plural geographically-spaced stations each normally collect page information for page subscribers assigned to that station and emit radio transmissions within a prescribed geographic area served by that station, each radio transmission being coded to identify a specific subscriber, and wherein each subscriber carries a receiver which responds only to radio transmissions which bear that receiver's own identification code, a method comprising the steps of:

in response to a command received at any station in said system from a subscriber located in a first geographic area other than that served by the home station to which that subscriber is assigned, storing at said home station the identity of the station which serves said first geographic area;

in response to collection of page information for that subscriber at any station in said system, transferring the received page information to the station which serves said first geographic area; and in response to reception of said page information for that subscriber at the station serving said first geographic area, emitting from that station and only that station a coded radio transmission which identifies that subscriber.

5. The method according to claim 4 wherein said command from a subscriber is effected by a local telephone call from said subscriber to a station serving said first geographic area.

6. The method according to claim 4 wherein said step of emitting includes further coding said radio transmission to identify the geographic area in which the paging party is located.

7. The method according to claim 4 wherein the frequency of said radio transmissions is the same in all of the geographic areas served by stations in said system.

8. The method according to claim 4 wherein a first group of said subscribers can only receive pages when located in the geographic area served by the station to which they are assigned, and a second group of said subscribers can receive pages when located in any geographic area in the system, and wherein the identification code for all subscribers in said second group includes a characteristic which is not present in the identification code for any of the subscribers in said first group.

9. The method according to claim 8 wherein individual subscribers in said first group have assigned identification codes which are unique in the geographic area served by the home station for those subscribers but which may be used for other subscribers of said first group which are served by a different home station.

10. The method according to claim 4 wherein the frequency of said radio transmissions is different in some of the geographic areas of the system from the frequency of said radio transmissions in other areas of said system.

11. A paging system of the type wherein multiple subscribers are each provided with a subscriber receiver which responds to a uniquely coded radio transmission by providing a perceptible indication that the subscriber is being paged, and in which each subscriber is assigned to a home station which transmits said radio transmission throughout a prescribed geographic area served by that station, said system comprising:

transfer means responsive to a predetermined command originating from at least one of said subscribers for automatically transferring page data subsequently received at said home station of said one subscriber to a further station which serves a further geographic area;

means responsive to each page intended for said one subscriber, and for which page data is received at said further station, for transmitting from said further station the uniquely coded radio transmission to which the receiver of said one subscriber responds; and means for automatically suspending transmission of uniquely coded radio transmissions, intended for a subscriber, from the home station of that subscriber in response to receiving a suspend command from that subscriber.

12. The system according to claim 11 further comprising:

means for automatically storing page data relating to pages for a subscriber for whom transmissions are suspended whenever transmissions are so suspended.

13. The system according to claim 12 further comprising:

means responsive to a reinstate command received from a subscriber for whom transmissions have been suspended and for whom page data is stored, for automatically transmitting a uniquely coded transmission to that subscriber from whatever station serves the geographic area from which said reinstate command originated.

14. A nationwide paging system of the type wherein plural geographically-spaced stations each normally collect page information for page subscribers assigned to that station and emit radio transmissions within a prescribed geographic area served by that station, each radio transmission being coded to identify a specific subscriber, and wherein each subscriber carries a receiver which responds only to radio transmissions which bear that receiver's own identification code, said system comprising:

means responsive to a command received at any station in said system, from a subscriber located in a first geographic area other than that served by the home station to which that subscriber is assigned, for storing at said home station the identity of the station which serves said first geographic area;

means responsive to collection of page information for that subscriber at any station in said system for transferring the received page information to the station which serves said first geographic area; and means responsive to reception of said page information for that subscriber at the station serving said first geographic area for emitting from that station and only that station a coded radio transmission which identifies that subscriber.

15. The system according to claim 14 wherein said command from a subscriber is effected by a local telephone call from said subscriber to a station serving said first geographic area.

16. The system according to claim 14 wherein said means for emitting includes further means for coding said radio transmission to identify the geographic area in which the paging party is located.

17. The system according to claim 14 wherein the frequency of said radio transmissions is the same in all of the geographic areas served by stations in said system.

18. The system according to claim 14 wherein a first group of said subscribers can only receive pages when located in the geographic area served by the station to which they are assigned, and a second group of said subscribers can receive pages when located in any geographic area in the system, and wherein the identification code for all subscribers in said second group includes a characteristic which is not present in the identification code for any of the subscribers in said first group.

19. The method according to claim 14 wherein the frequency of said radio transmissions is different in some of the geographic areas of the system from the frequency of said radio transmissions in other areas of said system.

20. In a paging system of the type wherein multiple subscribers are each provided with a subscriber receiver which responds to a uniquely coded radio transmission by providing a perceptible indication that the subscriber is being paged, and in which each subscriber is assigned to a home station which transmits said radio transmission throughout a prescribed geographic area served by that station, a method comprising the steps of:

responding to a predetermined command originating from at least one of said subscribers by automatically transferring page data subsequently received at said home station of said one subscriber to a further station which serves a further geographic area, wherein said predetermined command can be selectively introduced into said system at any time from each and every geographic area served by a system station by individual subscribers irrespective of whether that system station is the home station or said further station for said subscriber, said predetermined command being introduced into said system via a prescribed transmission medium linking the station in said system; and for each page intended for said one subscriber and for which page data is received at said further station, transmitting from said further station the uniquely coded radio transmission to which the receiver of said one subscriber responds.

21. The method according to claim 20 further comprising the step of:

automatically suspending transmission of uniquely coded radio transmissions intended for a subscriber by the home station of that subscriber in response to receiving a suspend command from that subscriber.

22. The method according to claim 20 wherein said prescribed transmission medium is a public telephone system and wherein said predetermined command is introduced via a local telephone call made by a subscriber to a system station from a location in the geographic area served by that system station.

23. The method according to claim 20 wherein the geographic areas in which each of said subscribers is located is stored in said system and wherein each subscriber's location is updated automatically upon instruction into said system of said predetermined command from that subscriber.

24. The method according to claim 23 wherein each home station stores information indicating the geographic area in which the subscribers assigned to that home station are located; wherein the geographic area location of all subscribers in said system is stored in a central location; and wherein if assigned subscribers move from area to area as indicated by said predetermined commands, updated subscriber location information is periodically transmitted via said prescribed transmission medium to said central location.

25. The method according to claim 20 wherein page data to be automatically transferred from one station to another is transmitted directly from station to station via said prescribed transmission medium in the form of a signal containing data for multiple pages.

26. The method according to claim 20 wherein page data to be automatically transferred from one station to another is transmitted via a trunk network in said prescribed transmission medium, said trunk network including transit stations intermediate said system stations for automatically receiving, compiling and disseminating the transferred page data.

27. The method according to claim 20 wherein said predetermined command is a signal representing a code which uniquely identifies the subscriber from which the command originates.

28. A paging system of the type wherein multiple subscribers are each provided with a subscriber receiver which responds to a uniquely coded radio transmission by providing a perceptible indication that the subscriber is being paged, and in which each subscriber is assigned to a home station which transmits said radio transmission throughout a prescribed home geographic area served by that station, said system comprising:

transfer means responsive to a predetermined command originating from at least one of said subscribers for automatically transferring page data subsequently received at said home station of said one subscriber to a further station which serves a further geographic area, wherein said home and said further stations include means for receiving said predetermined command directly from originating subscribers located in the geographic area served by that receiving station, irrespective of whether the originating subscriber is assigned to that receiving station or to another receiving station and irrespective of whether the originating subscriber is already in said further geographic area or is still in said home geographic area; and means responsive to each page intended for said one subscriber, and for which page data is received at said further station, for transmitting from said further station the uniquely coded radio transmission to which the receiver of said one subscriber responds.

* * * * *